(12) United States Patent
Satonaka

(10) Patent No.: US 6,956,637 B2
(45) Date of Patent: Oct. 18, 2005

(54) LIQUID CRYSTAL DISPLAY AND METHOD FOR FABRICATING SAME

(75) Inventor: Masaharu Satonaka, Kagoshima (JP)

(73) Assignee: NEC LCD Technologies, Ltd. (JP)

( * ) Notice: Subject to any disclaimer, the term of this patent is extended or adjusted under 35 U.S.C. 154(b) by 0 days.

(21) Appl. No.: 10/829,705

(22) Filed: Apr. 22, 2004

(65) Prior Publication Data

US 2004/0196413 A1 Oct. 7, 2004

Related U.S. Application Data

(62) Division of application No. 10/307,768, filed on Dec. 2, 2002, now Pat. No. 6,812,976.

(30) Foreign Application Priority Data

Dec. 3, 2001 (JP) .......................................... 2001-368283

(51) Int. Cl.[7] ........................... G02F 1/1333; H05K 5/00
(52) U.S. Cl. .......................................... 349/187; 349/58
(58) Field of Search .............................. 349/58, 59, 60, 349/65, 67, 187; 361/680, 681, 683; 345/905; 445/24, 25

(56) References Cited

U.S. PATENT DOCUMENTS 5,822,030 A * 10/1998 Uchiyama ................... 349/149

6,538,709 B1 * 3/2003 Kurihara et al. .............. 349/58

FOREIGN PATENT DOCUMENTS

JP 9-50030 2/1997

\* cited by examiner

*Primary Examiner*—Tarifur R. Chowdhury
*Assistant Examiner*—Tai Duong
(74) *Attorney, Agent, or Firm*—Choate Hall & Stewart LLP

(57) ABSTRACT

A liquid crystal display comprises a plurality of components including a panel unit that includes a liquid crystal display (LCD) panel with a display surface, a light conductive plate, and a lamp reflector. A first housing part or housing front has an opening exposing the display surface of the LCD panel. A second housing part or housing rear is complementary to the first housing part. The housing front has at least one horizontal retainer arranged to retain at least one of the components at a desired position within a hypothetical horizontal plane parallel to the display surface of the LCD panel, and a vertical retainer arranged to retain the components together. The housing rear has a load applying portion arranged to load the vertical retainer into firm engagement with the adjacent one of the components when the housing rear and the housing front are coupled to each other.

7 Claims, 18 Drawing Sheets

FIG.1
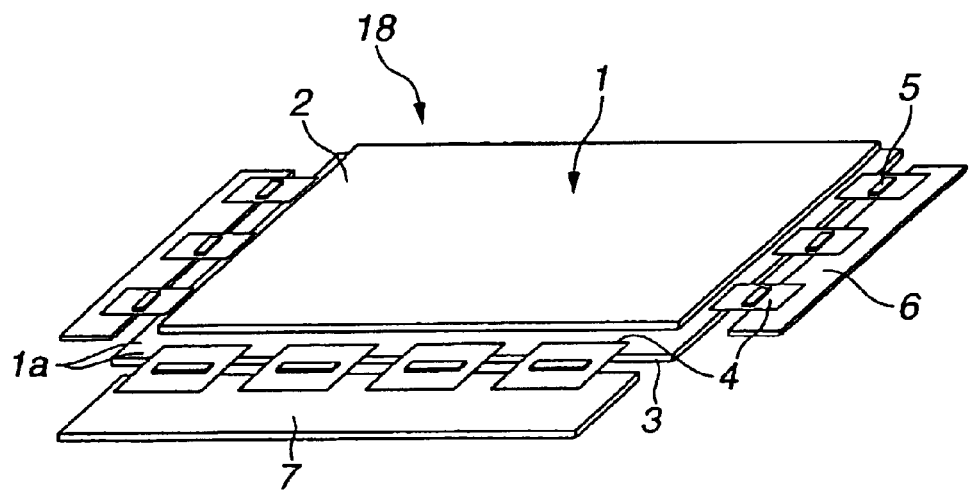
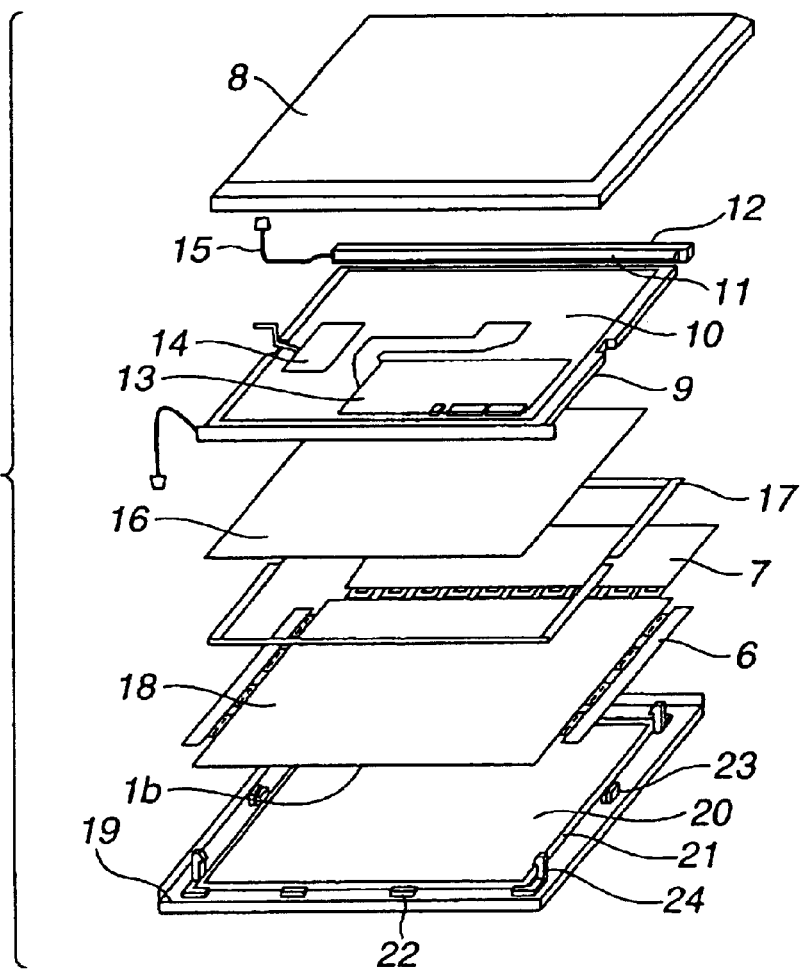
FIG.2

US 6,956,637 B2

LIQUID CRYSTAL DISPLAY AND METHOD FOR FABRICATING SAME

This application is a divisional of U.S. application Ser. No. 10/307,768 filed Dec. 2, 2002, now U.S. Pat. No. 6,812,976

BACKGROUND OF THE INVENTION

1. Field of the Invention

The present invention relates generally to a display device. More particularly, the present invention relates to a liquid crystal display and method for fabricating same.

2. Description of the Related Art

The market of liquid crystal displays (LCDs) is growing wider and wider over various fields including office automation equipments, audio and visual equipments, and mobile equipments due to their advantage in thickness, weight and power consumption. As shown in FIG. 23, in assembly of a LCD, a housing front 49 and a housing rear 48 cooperate with each other to retain a backlight unit 33, a panel unit 32 and a rear sheet metal 37 together in fixed operative relationship. The backlight unit 33 uses a front frame 35 and a rear frame 36 to retain lamp components, which include a lamp 11, a reflector 12, an optic sheet 16, a reflector sheet 10, and a light conductive plate 9. The panel unit 32 uses a front bezel 34 to retain a liquid display panel (LCD) 1. Connected to the LCD 1 are a connecting substrate 6 and a signal processing substrate 7 via a plurality of flexible substrates 4. The flexible substrates include driver integrated circuits (ICs). The rear sheet metal 37 has mounted thereto a converter substrate 13 and an inverter substrate 14. The converter substrate 13 is provided to convert external signal for transmission. The inverter substrate 14 is provided to supply a desired level of voltage to the lamp.

In the above-mentioned LCD, the lamp components are assembled to form one unit, the display components are assembled to form another unit and the signal processing circuit substrates are assembled to form other unit. Using the housing front 49 and housing rear 48, these units are interconnected and retained in operative relationship. Using the units in assembly is closely related to varying of specification of a LCD with different user needs. Advantages of using the units include the following. Firstly, selecting units and interconnecting the selected units to meet different user needs may achieve a wide use of a LCD. Secondary, an ease and convenience of transport may be recognized if the components are manufactured at different sites function by function because the components are retained in operative relationship by frames.

The operative interconnection of the units may include not only electric connection, but also optic connection. Increased accuracy is required in alignment to provide performance as high as expected. Maintaining good display quality requires accurate alignment between the backlight and panel units 33 and 32. It is the common practice to use frames to retain them together in operatively relationship.

One example of retaining a panel unit and a backlight unit is disclosed in JP-A 11-281963 (Toshiba). According to the teaching of this laid-open publication, the backlight unit includes a frame formed with first and second protrusions for alignment of a LCD panel of the panel unit. The first and second protrusions are arranged across the LCD panel for abutting engagement with the remote sides of it with clearance. A bezel is fast on sides of the frame of the backlight unit to retain the panel unit to the backlight unit in operative relationship. The bezel is formed with a bias protrusion that bulges into clearance between the second protrusion and the adjacent sides of the LCD panel, pressing it against the first protrusion.

Another example is disclosed in U.S. Pat. No. 5,905,550, Ohgami et al (=JP-A 9-297542, Toshiba). According to the teaching of this prior reference, a panel unit is formed with attachment flanges. With a bezel, the panel unit is fixed to a backlight unit to form an assembly. The assembly is mounted by interposing the attachment flanges between a housing front and a housing rear.

With reference to FIGS. 24 to 33, the first mentioned LCD will be further described. FIGS. 24 to 33 are perspective views showing fabricating processes of the LCD. FIGS. 24 to 27 show a sequence of processes for fabricating the backlight unit 33. FIGS. 28 to 30 show the subsequent fabricating processes till completion of the LCD.

Firstly, the assembly of a backlight unit 33 is described. As shown in FIG. 24, a reflector sheet 10, a lamp 11 and a reflector 12 are inserted into a rear frame 36. With a lamp retainer rubber 11a, the lamp 11 is temporarily fixed to the reflector 12 and has a lamp cable 15. Subsequently, as shown in FIG. 25, a light conductive plate 9, a diffusion film 16b and a lens film 16a are placed on the reflector sheet 10 within the rear frame 36 one after another. The diffusion and lens films 16b and 16a form an optic sheet 16. Finally, as shown in FIG. 26, a front frame 35 cooperates with the rear frame 36 to interpose between them the backlight components, completing the assembly of the backlight unit (see FIG. 27). Couplings 39, each having a hook 36a on the rear frame 36 inserted into its mating hook hole 35a on the front frame 35, and screws 38 fix the rear and front frames 36 and 35 to each other together.

Secondly, the assembly of a display unit 31 is described. As shown in FIG. 28, the backlight unit 33 is formed with a rib 40 for aligning a panel unit 32, which includes an LCD panel 1 with flexible substrates 4 connected to connecting and signal processing substrates 6 and 7. The LCD panel 1 is placed on the backlight unit 33. Subsequently, as shown in FIG. 29, the flexible substrates 4 are bent down, admitting the connecting and signal processing substrates 6 and 7 into behind the backlight unit 33. In one case, the connecting substrates 6 may be left on a forward surface of the backlight unit 33. In another case, the connecting substrates 6 may be fixedly attached to sides of the backlight unit 33. Subsequently, as shown in FIG. 30, a front bezel 34 and the backlight unit 33 interpose between them the panel unit 32. Couplings 31b, each including a hook 35b on the sides of the front frame 35 inserted into its mating hook hole 34a, fix the front bezel 34 and the backlight unit 33 to each other together.

With reference to FIGS. 31 to 33, the subsequent fabrication processes are described. As shown in FIG. 31, the display unit 31 is turned up side down to face a display surface 32a down. Subsequently, a rear sheet metal 37, which has mounted thereto inverter and converter substrates 14 and 13 by hooks 37a and screws 41, is mounted onto the rear surface of the display unit 31. Next, as shown in FIG. 32, screws 43 are used to fix the rear sheet metal 37 onto the rear surface of the backlight unit 33. Connecting cables 42 interconnect the substrates. Lamp cables 15 are connected to the inverter substrate 14. Finally, as shown in FIG. 33, with hooks 46a inserted into hook holes 46b and with screws 47, a housing front 49 and a housing rear 48 are fixed to each other to embrace the display unit 31.

The above-described LCD involves the following problems. One problem is the difficulty in further reducing the size, thickness and weight due to the use of front and rear frames 35, 36 in forming the backlight unit 33 and the use of front bezel 34 in forming the display unit 31. Another problem is the difficulty in maintaining precision required in final assembly of each product due to accumulation of alignment errors inevitably existing in the backlight and display units.

Another problem is the increased number of fabrication processes due to additional process of retaining or embracing assembled components of each unit and additional process of interconnecting the units.

Another problem is the complicated processes that require skilled labor. As mentioned before, the following processes form the display unit 31. One process is to put the panel unit 32 onto the backlight unit 33 with its display surface 32a up. The subsequent process is to attach the rear sheet metal 37 to the display unit 31 after turning the display unit 31 through 180 degrees until the display surface 32a faces down. In addition to such complicated work, the operation to turn the display unit 31 through 180 degrees involves potential danger that the LCD panel 1 may be scratched and/or damaged.

Another problem is the difficulty in cost reduction due to increased number of components. The increased number of components poses supply and delivery problem. Besides, there is the tendency that a lead-time from arrival of components to assembly of them is long.

A need remains for a LCD and method for fabricating same without frames and/or bezel.

SUMMARY OF THE INVENTION

An object of the present invention is to provide a liquid crystal display, which meets the above-mentioned need.

Another object of the present invention is to provide a method for fabricating a liquid crystal display, which meets the above-mentioned need.

According to one exemplary implementation of the invention, there is provided a liquid crystal display comprising:

a plurality of components including a panel unit that includes a liquid crystal display (LCD) panel with a display surface, a light conductive plate, and a lamp reflector;

a first housing part having an opening exposing the display surface of the LCD panel;

a second housing part complementary to the first housing part;

the first housing part having at least one horizontal retainer arranged to retain at least one of the components at a desired position within a hypothetical horizontal plane parallel to the display surface of the LCD panel, and a vertical retainer arranged to retain the components together, the second housing part having a load applying portion arranged to load the vertical retainer into firm engagement with the adjacent one of the components when the second housing part and the first housing part are coupled to each other, the first and second housing parts retaining the components together when the first and second housing parts are coupled to each other.

BRIEF DESCRIPTION OF THE DRAWINGS

The present invention will be apparent from the following more particular description of exemplary embodiments of the invention as illustrated in the accompanying drawings. The drawings are not necessarily scale, emphasis instead being placed upon illustrating the principles of the invention.

FIG. 1 is a perspective view of a panel unit including a liquid crystal panel.

FIG. 2 is an exploded perspective view of a first housing part (or housing front), a second housing part (or housing rear) and components of a liquid crystal panel according to the present invention.

DESCRIPTION OF THE EXEMPLARY EMBODIMENTS

Figure 3:
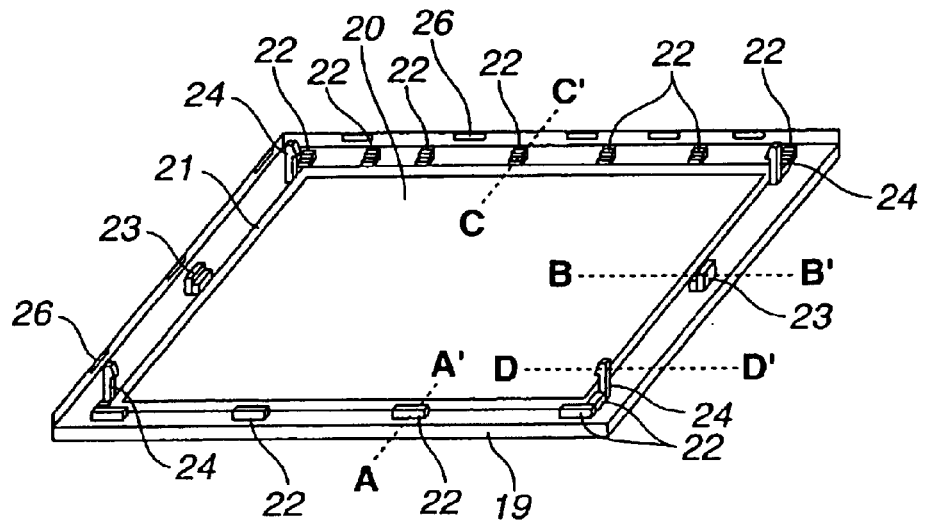
FIG. 3 is a perspective view of the housing front according to the present invention.

Referring to the accompanying drawings, the same reference numerals are used to designate same or similar parts or portions throughout each view of Figures for the sake of brevity of description.

With reference to the accompanying drawings, particularly to FIGS. 1 to 22(b), one exemplary implementation of the present invention is described.

According to the exemplary implementation of the present invention, one exemplary implementation of a liquid crystal display (LCD) according to the present invention includes such components as a panel unit 18, a lamp 11, a reflector 12, a light conductive plate 9, and an optic sheet 16. A housing front 19 and a housing rear 8 cooperate with each other to retain between them the components together. The housing front 19 is formed with an opening 20 to expose the display surface of the LCD panel 1. The housing front and rear 19 and 8 may be provided by molding plastic resin or forming metal. More specifically describing on the components, as shown in FIG. 1, the panel unit 18 includes a LCD panel 1, connecting substrates 6, a signal processing substrate 7 and flexible substrates 4. Some of the flexible substrates 4 interconnect the LCD panel 1 and each of the connecting substrates 6. The other flexible substrates 4 interconnect the LCD panel 1 and the signal processing substrate 7. Light from the lamp 11 is reflected at the reflector 12. The reflected light illuminates the light conductive plate 9. The light issued from the light conductive plate 9 is reflected, dispersed and collected by the optic sheet 16.

In assembly, the housing front 19 is placed with its surface down. With its display surface 1b down, the LCD panel 1 is put onto the rear surface of the housing front 19. The housing front 19 is formed with a LCD panel retainer 22. The LCD panel retainer 22 retains the LCD panel 1 in a desired position within a hypothetical horizontal plane parallel to the display surface 1b. Subsequently, the optic sheet 16 and the light conductive plate 9 are put onto the LCD panel 1. The optic sheet may be of the type including a portion, which is put onto the light conductive plate. The light conductive plate may be of the type including a portion, which portion is combined with the lamp 11 and/or the reflector 12. The optic sheet 16 includes a transparent sheet of plastic material and a sheet that has high reflectance and low transparency.

The housing front 19 is also formed with a light conductive plate (LCP) retainer, which retains the light conductive plate 9 in a desired position within a hypothetical horizontal plane parallel to the display surface 1b. After mounting and interconnecting the signal processing substrate 7, lamp 11 and reflector 12, the housing rear 8 is coupled to the housing front 19 to retain between them the components. To provide firm engagement between the LCD panel 1 and housing front 19, an elastic sheet 21 or an adhesive sheet may be placed on the portion around the opening 20, onto which the LCD panel 1 is put.

The LCD panel retainer 22 may be so constructed and arranged as to retain portions of the light conductive plate 9 and reflector 12 as well as the LCD panel 1. The light conductive plate retainer may be so constructed and arranged as to retain a portion of the reflector 12 as well as the light conductive plate 9.

Figure 7:
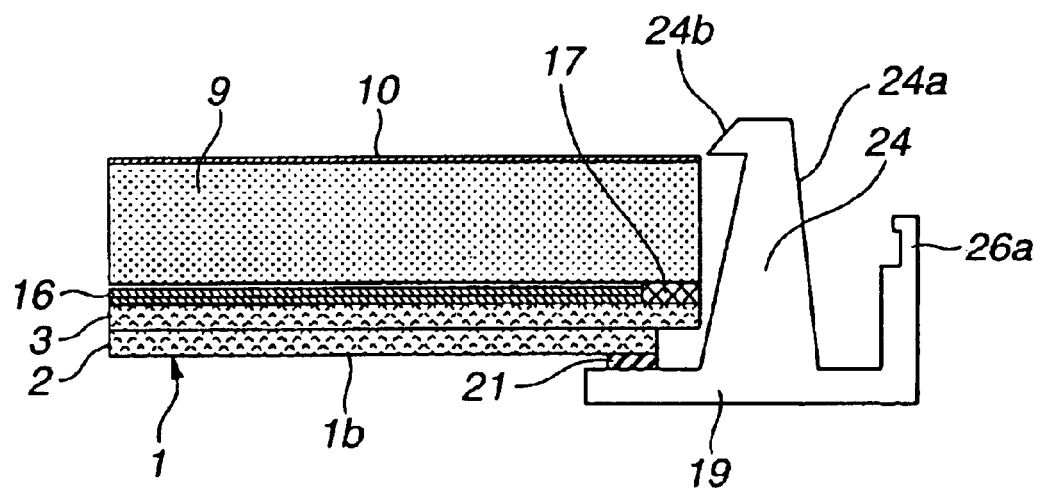
FIG. 7 is a section taken through the line D–D' in FIG. 3.
Figure 8A:
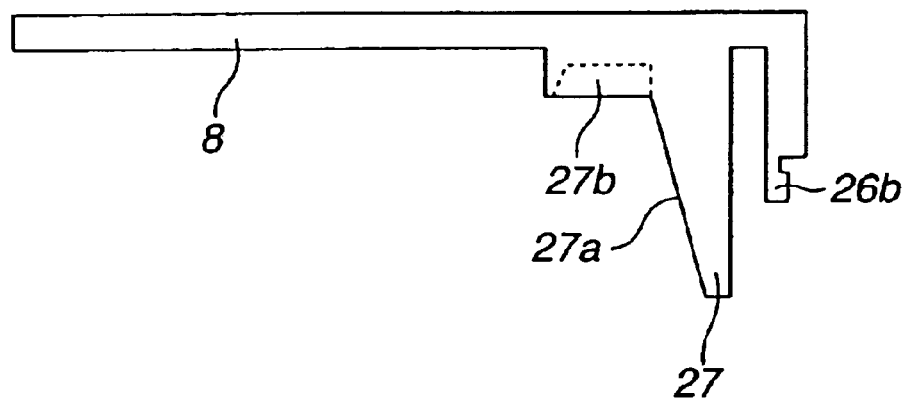
FIG. 8(a) is a sectional view of a portion of the housing rear showing a load applying portion in the form of a brace.
Figure 8B:
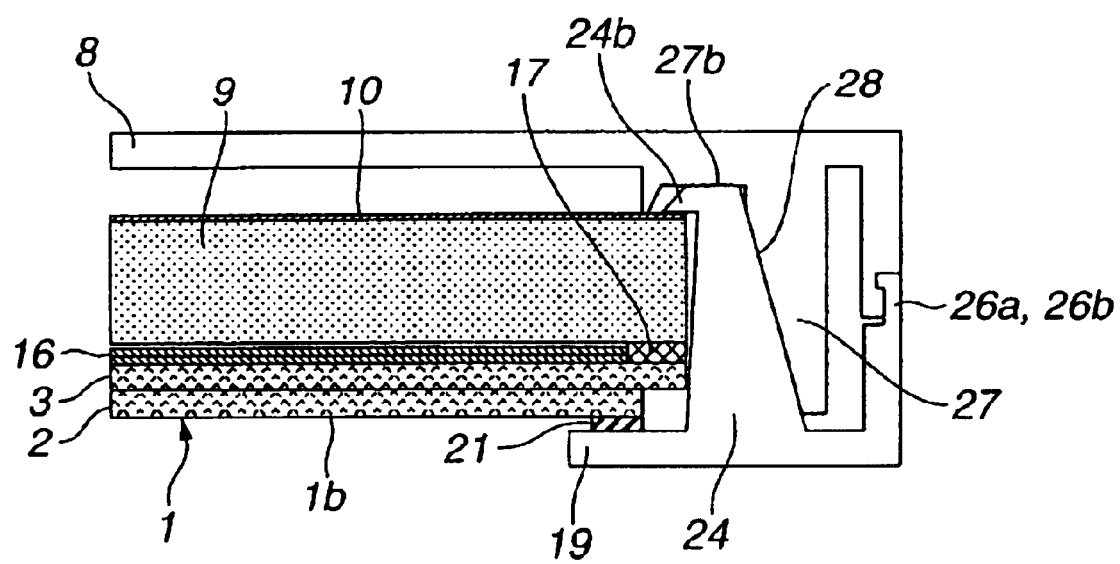
FIG. 8(b) is a section similar to FIG. 7 but in loaded state when the housing front and rear are coupled to each other.

In the exemplary implementation, the LCP retainer includes a LCP horizontal retainer 23 and a LCP vertical retainer 24. The LCP horizontal retainer 23 is so constructed and arranged as to retain the light conductive plate 9 at a desired position within a hypothetical horizontal plane parallel to the display surface 1b of the LCD panel 1. The LCP vertical retainer 24 is so constructed and arranged as to retain the light conductive plate 9 at a desired position within a hypothetical vertical plane orthogonal to the hypothetical horizontal plane. FIG. 7 shows the cross sectional profile of one exemplary embodiment of LCP vertical retainer 24. In FIG. 7, the LCP vertical retainer 24 is formed with a hook 24b at a head end. The LCP vertical retainer 24 has an inboard surface positioned to contact with the light conductive plate 9 and an outboard surface on the remote side of the inboard surface. The LCP vertical retainer 24 is tapered toward the head end so that the outboard surface is inclined inboard toward the head end to provide a pressure acting site 24a. FIGS. 8(a) and 8(b) show a portion of the cross sectional profile of housing rear 8 disengaged from the housing front 19 and that engaged with it, respectively. As readily seen from FIGS. 8(a) and 8(b), the housing rear 8 has formed therewith a brace 27 protruding from a portion thereof. When the housing rear and front 8 and 19 are engaged as shown in FIG. 8(b), the brace 27 contacts with the LCP vertical retainer 24 at an interface 28, and it covers the LCP vertical retainer 24. The cross sectional profile of the brace 27 shown in FIG. 8(a) clearly indicates that the brace 27 is tapered downward toward a head end to provide an inboard brace wall 27a inclined outboard toward the head end. The brace 27 has a vertically extending outboard wall. The brace 27 is formed with a hook holder 27b. When the housing rear and front 8 and 19 are engaged, the inclined inboard brace wall 27a is in firm contact with the pressure acting site 24a of the LCP vertical retainer 24, loading the vertical retainer 24 through the interface 28. The hook holder 27b receives the hook 24b.

With reference to FIGS. 7 and 8(b), pressing the housing rear 8 into coupling engagement with the housing front 19 loads the LCP vertical retainer 24 through engagement between the inclined inboard brace wall 27a and the pressure acting site 24a. This inclines the LCP vertical retainer 24 inwardly toward the light conductive plate 9, causing the hook 24b to move for insertion into the hook holder 27b and into firm engagement with the rear surface of the light conductive plate 9. At peripheral portions, the housing front and rear 19 and 8 are formed with coupling portions 26a and 26b, respectively. Engaging the coupling portion 26a and 26b with each other completes coupling between the housing front and rear 19 and 8. With respect to the components of the LCD contained within the housing, the coupling portions 26b of the housing rear 8 are inboard and the coupling portions 26a of the housing front 19 are outboard.

Comparing the above-described structure with the before described structure in connection with FIGS. 23 to 33 clearly indicates that the front and rear frames 35 and 36 used to retain the backlight unit 33 and the front bezel 34 used to retain the LCD panel 1 are no longer needed. This has resulted in a considerable reduction in the number of components and a considerable reduction in the number of fabrication processes. Besides, a considerable reduction in dimension and weight of the housing front and rear 19 and 8 is now possible.

According to the exemplary implementation of the present invention, the panel retainer 22, LCP horizontal retainer 23 and LCP vertical retainer 24 align and hold the components of the LCD with enhanced precision and force.

The following sections provide description on exemplary embodiments according to the present invention.

FIGS. 1 to 19 show one exemplary embodiment according to the present invention.

With reference to FIG. 1, the reference numeral 18 generally designates a panel unit. The panel unit 18 includes a LCD panel 1. The LCD panel 1 includes two opposed glass substrates 3 and 2. The glass substrate 3 has deposited thereon a layer of thin film transistor. Confined within a space between the glass substrates 3 and 2 is liquid crystal. At locations along its peripheral edge, the LCD panel 1 has terminal portions 1a. At the terminal portions 1a, the LCD panel is connected to a number of flexible substrates 4. The flexible substrates 4 carry integrated circuits (ICs) 5, respectively, for driving of the LCD panel 1. At one sides, the flexible substrates 4 are connected to the LCD panel 1. At the other sides, some of the flexible substrates 4 are connected to the adjacent one of connecting substrates 6, and the other flexible substrates 4 are connected to a signal processing substrate 7. The flexible substrates 4 establish electrical connection between the adjacent flexible substrates 4. The signal processing substrate 6 controls supply of desired electric signals to the ICs 5.

Anisotropic conductive adhesive provides connections between the LCD panel 1 and the flexible substrates 4, connections between the flexible substrates 4 and the connecting substrates 6, connections between the flexible substrates and the signal processing substrate 7. If desired, a flexible substrate that does not carry an IC or a chip on film (COF) may replace at least one of the flexible substrates 4. If desired, a chip on glass (COG) structure that may be directly mounted to an LCD panel may be used instead of each IC 5.

With reference now to FIG. 2, description is made on a structure for assembling a LCD that employs the above-mentioned panel unit 18.

FIG. 2 shows a housing front 19, which may be provided by molding plastic resin or forming metal. The housing front 19 is formed with an opening 20 to expose the display surface of the LCD panel 1. In assembly, the housing front 19 is placed with its surface down. With its display surface 1b down, the LCD panel 1 of the panel unit 18 is put onto the rear surface of the housing front 19.

In the before described structure in connection with FIGS. 23 to 33, it was necessary to turn the display unit 31 through 180 degrees to face the display surface 32a of the panel unit 32 down for ease of the subsequent installation work of the substrates. However, in the exemplary embodiment, such turning operation is no longer needed because the panel unit 18 is put onto the rear surface of the housing front 19 with the display surface 1b of the LCD panel 1 down. To provide firm engagement between the LCD panel 1 and the rear surface of the housing front 19, an elastic sheet 21 may be placed between them.

Figure 4:
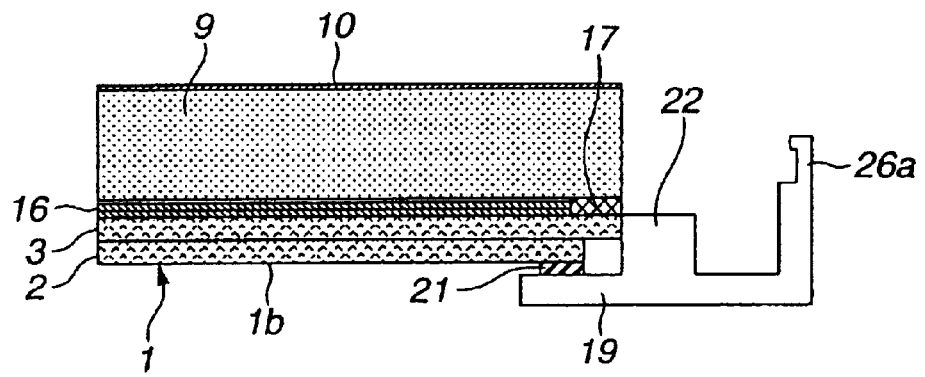
FIG. 4 is a section taken through the line A–A' in FIG. 3.
Figure 6:
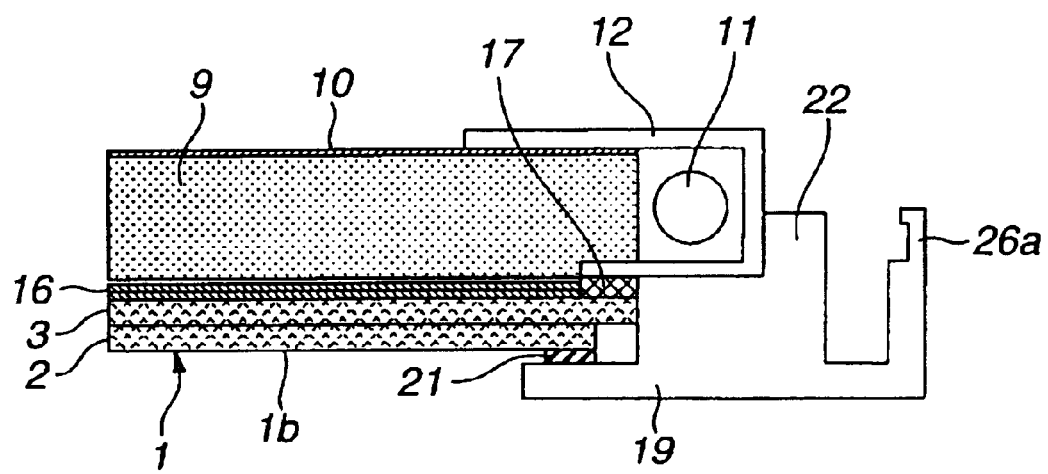
FIG. 6 is a section taken through the line C–C' in FIG. 3.

With reference now to FIG. 3, the housing front 19 is formed with a LCD panel retainer 22 to retain the LCD panel 1 of the panel unit 18 in a desired position within a hypothetical horizontal plane parallel to the display surface 1b. The LCD panel retainer 22 includes at least one panel retainer rib or protrusion. In this embodiment, the LCD panel retainer 22 includes a plurality of panel retainer ribs or protrusions at spaced locations on the edge of the rear surface around the opening 20. FIG. 4 is a section taken through the line A–A' in FIG. 3, showing the cross sectional profile of one type of the panel retainer ribs 22. FIG. 6 is a section taken through the line C–C' in FIG. 3, showing the cross sectional profile of another type of the panel retainer ribs 22. As shown in FIG. 4, the panel retainer rib 22 of the one type has an inboard surface in abutting engagement with the adjacent side of the glass substrate 3 of the LCD panel 1. This retainer rib 22 is in the form of a protrusion that has a predetermined height not exceeding the height of elevation of the rear surface of the LCD panel 1. The panel retainer ribs 22 shown in FIGS. 4 and 6 cooperate with each other to retain the LCD panel 1 at around the desired position within the hypothetical horizontal plane parallel to the display surface 1b.

In FIG. 4, the glass substrate 3 is illustrated as being in abutting engagement with the panel retainer rib 22. As a light conductive plate (LCP) vertical retainer 24 to be described later performs final alignment of the components, it is not necessary to keep such abutting engagement between the glass substrate 3 and the panel retainer ribs 22. A clearance may be left between them. The clearance may be left to provide a margin accounting for an error in dimension of the glass substrate 3.

Figure 5:
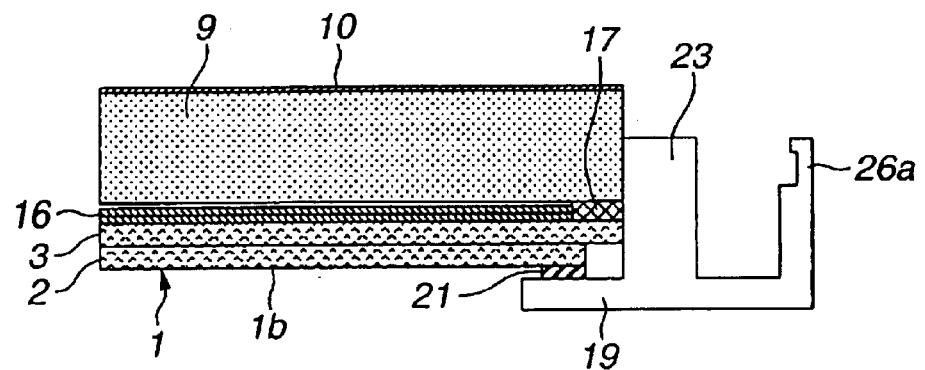
FIG. 5 is a section taken through the line B–B' in FIG. 3.

Subsequently after placing the LCD panel 1, a spacer 17, an optic sheet 16 and a light conductive plate 9 are put onto the rear surface of the LCD panel 1. With continuing reference to FIG. 3, the housing front 19 is formed with a LCP horizontal retainer 23. In the embodiment, the LCP horizontal retainer 23 includes a plurality of LCP horizontal retainer ribs 23 located at spaced locations on the edge of the rear surface around the opening 20. FIG. 5 is a section taken through the line B–B' in FIG. 3, showing the cross sectional profile of the LCP horizontal retainer rib 23. As best seen in FIG. 5, a portion of the adjacent side face of the light conductive plate 9 is in abutting engagement with an inboard surface of the LCP horizontal retainer rib 23. The LCP horizontal retainer rib 23 is in the form of a protrusion that has a predetermined height not exceeding the height of elevation of the surface of the light conductive plate 9. The LCP horizontal retainer ribs 23 cooperate with each other to retain the spacer 17 and light conductive plate 9 at around a desired position within the horizontal plane parallel to the display surface 1b.

In FIG. 5, the light conductive plate 9 is illustrated as being in abutting engagement with the LCP horizontal retainer rib 23. As mentioned before, the LCP vertical retainer 24 performs final alignment of the components, it is not necessary to keep such abutting engagement between the light conductive plate 9 and the LCP vertical retainer ribs 23. A clearance may be left between them. The clearance may be left to provide a margin accounting for an error in dimension of the light conductive plate 9.

This section provides description why the panel retainer ribs 22 and LCP horizontal retainer ribs 23 are provided to retain the LCD panel 1 and light conductive plate 9. Accounting for a difference in size between the LCD panel 1 and the light conductive plate 7 and a difference in error in dimension between them led to the provision of two different retainer ribs 22 and 23 for retaining the LCD panel 1 and light conductive plate 9, respectively. According to one exemplary embodiment of a method for fabricating a LCD, a need exists for using a light conductive plate 9 that is wider in horizontal dimension than or as much as the associated LCD panel 1. With regard to the error in dimension, there is an error in dimension ranging from ±0.1 to ±0.3 mm upon cutting a glass substrate to a desired dimension, and there is an error in dimension ranging from ±0.3 to ±0.6 mm upon cutting a light conductive plate to a desired dimension out of acryl plate. Taking into account the difference in error in dimension between the glass substrate and light conductive plate, it is required that a light conductive plate be wider in horizontal dimension than glass substrates of the LCD panel.

Figure 9A:
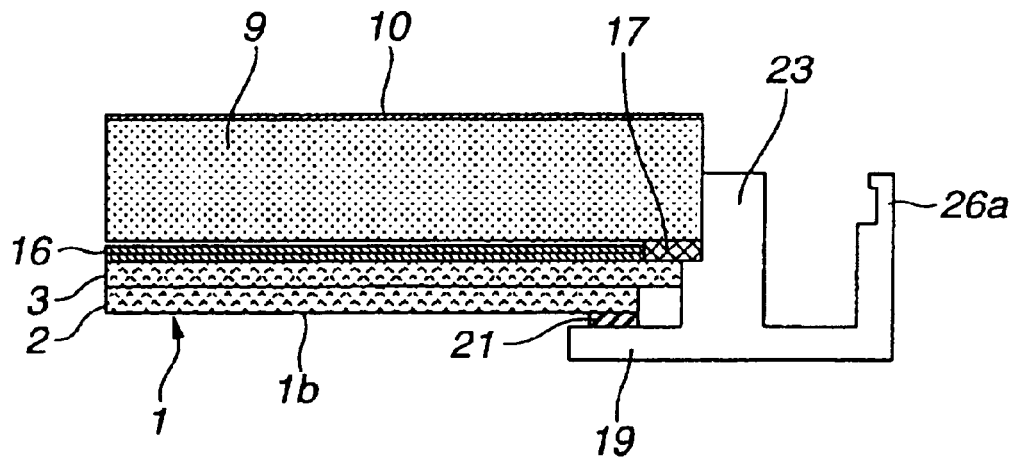
FIG. 9(a) is a section similar to FIG. 7 showing one modification.
Figure 9B:
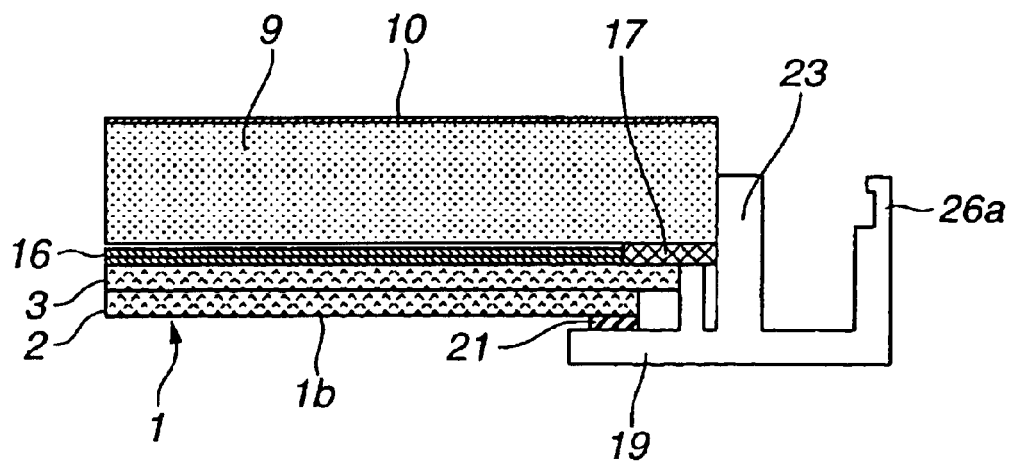
FIG. 9(b) is a section similar to FIG. 7 showing another modification.

As shown in FIGS. 9(a) and 9(b), a panel retainer 22 may be closely associated with a LCP horizontal retainer 23. FIG. 9(a) shows a protrusion for the panel retainer rib 22 as an integral part of a protrusion for the LCP horizontal retainer rib 23 to form a shoulder. FIG. 9(b) shows a protrusion for the panel retainer rib 22 and a protrusion for the LCP horizontal retainer rib 23 formed on the same location.

With reference to FIG. 6, after placing the light conductive plate 9, a reflector sheet 10 is put onto the rear surface of the light conductive plate 9. Subsequently, a lamp 11 and a reflector 12 are installed. As best seen in FIG. 6, another type of panel retainer rib 22 includes a protrusion having a first inboard surface for abutting engagement with the glass substrate 3 of the LCD panel 1 and a second inboard surface for abutting engagement connected via a shoulder surface to the first inboard surface. The shoulder surface and the second inboard surface are arranged for abutting engagement with the reflector 12.

Finally, the housing rear 8 is combined with the housing front 19. The housing front and rear 19 and 8 cooperate with each other to retain between them the LCD components together. For final accurate alignment of the components, the housing front 19 is formed with the before-mentioned LCP vertical retainer 24 as shown in FIG. 7, and the housing rear 8 is formed with a brace 27 as shown in FIG. 8(a).

With reference now to FIGS. 7, 8(a) and 8(b), the LCP vertical retainer 24 and the brace 27 will be described below. With reference also to FIG. 3, it is apparent that, in the embodiment, the LCP vertical retainer 24 includes a plurality of LCP vertical retainer ribs 24 at spaced locations on the edge of the rear surface of the housing front 19 around the opening 20.

FIG. 7 shows the cross sectional profile of one exemplary embodiment of LCP vertical retainer rib 24. In FIG. 7, the LCP vertical retainer rib 24 is formed with a hook 24b at a head end. The LCP vertical retainer rib 24 has an inboard surface arranged to contact with the light conductive plate 9 and an outboard surface on the remote side of the inboard surface. The LCP vertical retainer rib 24 is tapered toward the head end so that the outboard surface is inclined inboard toward the head end to provide a pressure acting site 24a.

FIGS. 8(a) and 8(b) show a portion of the cross sectional profile of housing rear 8 disengaged from the housing front 19 and that engaged with it, respectively. As readily seen from FIGS. 8(a) and 8(b), the housing rear 8 has formed therewith the brace 27 protruding from a portion thereof. In the exemplary embodiment, the brace 27 includes a plurality of brace or holder ribs 27. When the housing rear and front 8 and 19 are engaged as shown in FIG. 8(b), the brace ribs 27 come into contact with the LCP vertical retainer ribs 24, respectively, at an interface 28, and cover the LCP vertical retainer ribs 24, respectively. The cross sectional profile of the brace rib 27 shown in FIG. 8(a) clearly indicates that the brace rib 27 is tapered downward toward a head end to provide an inboard brace wall 27a inclined outboard toward the head end. The brace rib 27 has a vertically extending outboard wall. The brace 27 is formed with a hook holder 27b. When the housing rear and front 8 and 19 are engaged, the inclined inboard brace wall 27a is in firm engagement with the pressure acting site 24a of the LCP vertical retainer rib 24, loading the vertical retainer rib 24 through the interface 28. The hook holder 27b receives the hook 24b.

With reference to FIGS. 7 and 8(b), pressing the housing rear 8 into coupling engagement with the housing front 19 loads the LCP vertical retainer ribs 24 through engagement between the inclined inboard brace wall 27a and the pressure acting site 24a. This inclines the LCP vertical retainer ribs 24 inwardly toward the light conductive plate 9, causing the hooks 24b to move for insertion into the hook holders 27b and into firm engagement with the rear surface of the light conductive plate 9. At peripheral portions, the housing front and rear 19 and 8 are formed with coupling portions 26a and 26b, respectively. Engaging the coupling portion 26a and 26b with each other completes coupling between the housing front and rear 19 and 8. With respect to the components of the LCD contained within the housing, the coupling portions 26b of the housing rear 8 are inboard and the coupling portions 26a of the housing front 19 are outboard.

Although not shown, the housing front 19 may be provided with switches including a main switch and an image quality control switch. The housing rear 8 may be provided with a power supply connector, a various kinds of interface connectors, for example, a DVI-I connector and a USM hub. A stand may be connected via a metal plate to the housing rear 8.

Using the housing front 19 including the panel retainer 22, LCP horizontal retainer 23 and LCP vertical retainer 24, the panel unit 18 allows simple piling of the components including the LCD panel 1 and the light conductive plate 9. The components so piled up are aligned and retained in a desired horizontal and vertical relationship only by coupling the housing rear 8 with the housing front 19.

Figure 10A:
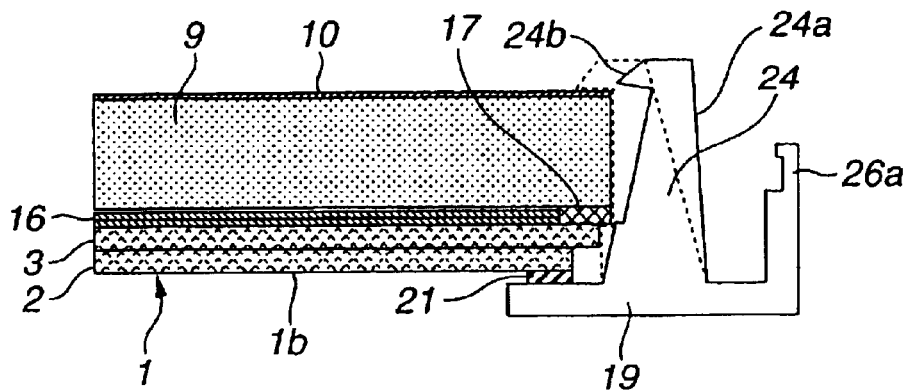
FIG. 10(a) is a similar view to FIG. 7 showing another modification.
Figure 10B:
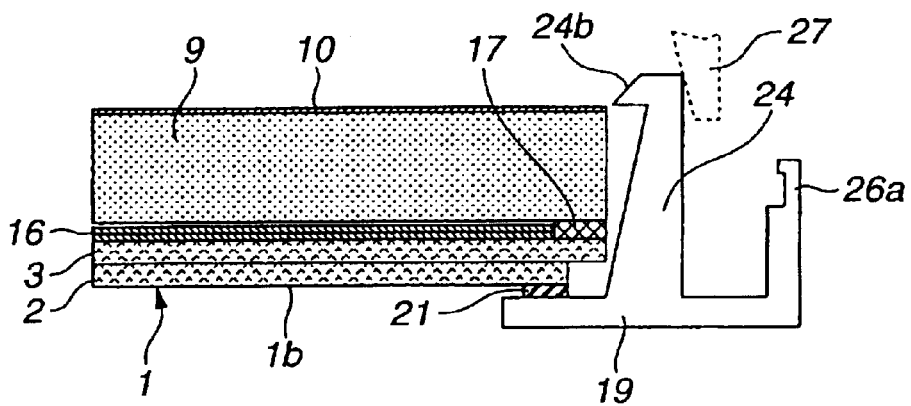
FIG. 10(b) is a similar view to FIG. 7 showing another modification.

With reference to FIGS. 10(a) and 10(b), two modifications of an LCP vertical retainer 24 are described.

The modified LCP vertical retainer 24 of FIG. 10(a) is substantially the same as that shown in FIG. 7 except the provision of a protrusion serving as a panel retainer 22. In the loaded position as indicated by the broken line, the protrusion comes into contact with a glass substrate 3 of an LCD panel 1 to work as the panel retainer 22. In this case, the independent panel retainer 22 shown in FIG. 4 may not be needed.

The modified LCP vertical retainer 24 of FIG. 10(b) is substantially the same as that shown in FIG. 7 except that a pressure acting site 24a is vertical in unloaded state.

With reference again to FIG. 3, in the embodiment, each of the four sides of the housing front 19 has at least one of the panel retainer ribs 22. Two LCP horizontal retainer ribs 23 are provided on the two opposed sides of the housing front 19, respectively. Four LCP vertical retainer ribs 24 are provided on four corner portions of the housing front 19. The number of ribs is not limited to this example. Any appropriate number of desired ribs may be provided as long as interference with connecting substrates 6, signal processing substrate 7 and reflector 12 may be avoided.

With reference to FIGS. 11 to 19, a method for fabricating a LCD according to the exemplary embodiment is described.

Figure 11:
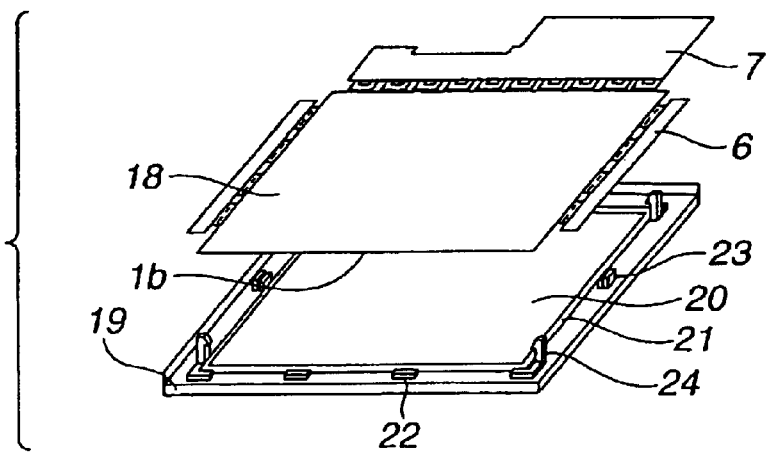
FIGS. 11 to 19 are perspective view of fabrication processes.
Figure 12:
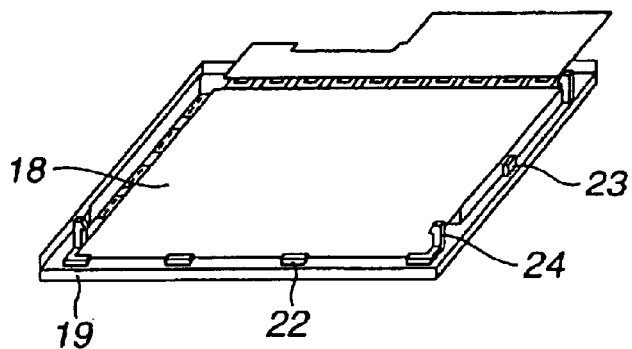

As shown in FIGS. 11 and 12, with its display surface 1b down, the panel unit 18 is put onto the rear surface of the housing front 19. The panel retainer ribs 22 on the housing front 19 retains the LCD panel 1 at the desired position within the hypothetical horizontal plane parallel to the display surface 1b so that the display surface 1b is exposed via the opening 20. An elastic sheet 21 may be placed on rear surface of the front housing 19 around the opening 20 between the LCD panel 1 and the housing front 19.

Figure 13:
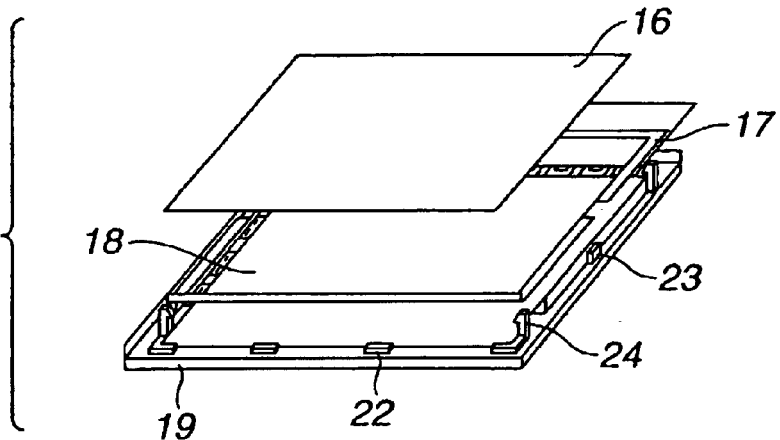

Subsequently, as shown in FIG. 13, the spacer 17 of plastic material has 0.2 mm to 1.5 mm thick and 1.0 mm to 5.0 mm wide. The spacer 17 is attached by adhesive to the rear surface of the LCD panel 1. The LCP horizontal retainer ribs 23 cooperate with each other to guide the spacer 17 into the desired position on the rear surface of the LCD panel 1. Subsequently, the optic sheet 16 is inserted into an area defined by the spacer 17.

Figure 14:
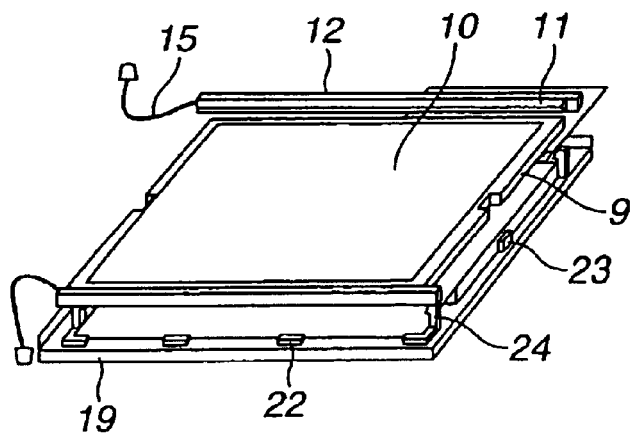
Figure 15:
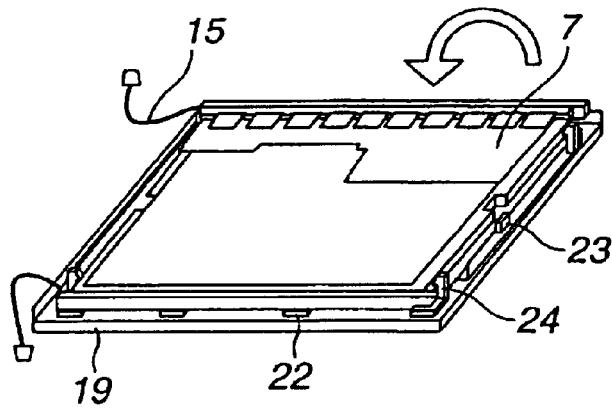

Next, as shown in FIG. 14, the light guide plate 9 is placed on the spacer 17. A reflector 12 with a lamp 11 has a U-like cross sectional profile. At its open end of the U, the reflector 12 grips the light conductive plate 9 so that light issued the lamp 11 and the reflected light from the reflector 12 enter inwardly of the light conductive plate 6 from one side. The LCP horizontal retainer ribs 23 cooperate with each other to retain the light conductive plate 9 at the desired position within the hypothetical horizontal plane. The panel reflector ribs 22 retain the reflector 12. In this process, the flexible substrates 4 are bent to allow the connecting substrates 6 to extend for insertion into grooves, with which the housing front 19 is formed.

The reflector sheet 10 is placed on the rear surface of the light conductive plate 9. Subsequently, the signal processing substrate 7 is fixedly attached via adhesive tape to the rear surface of the reflector sheet 10.

Figure 16:
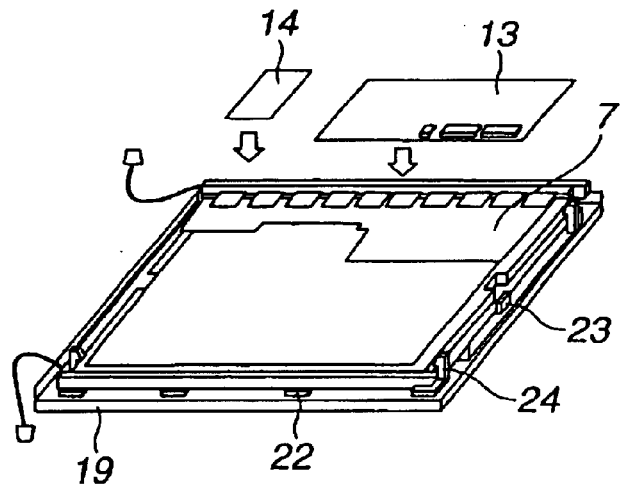
Figure 17:
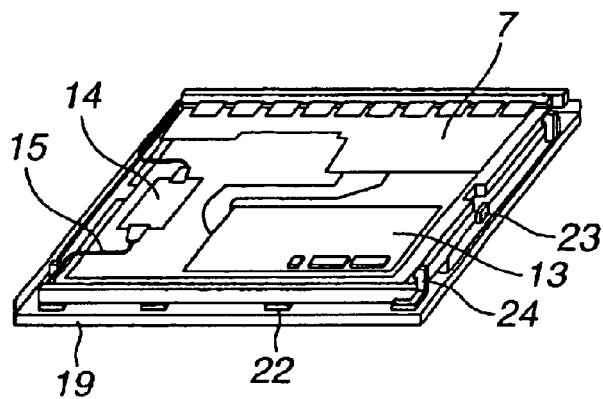

Subsequently, as shown in FIGS. 16 and 17, the converter substrate 13 and inverter substrate 14 are fixedly attached via adhesive tape to the rear surface of the reflector sheet 10. The inverter substrate 14 is connected to the lamp cables 15. The converter substrate 13 is connected to the signal processing substrate 7. It is noted that the metal sheet carrying the converter and inverter substrates is no longer needed.

Figure 18:
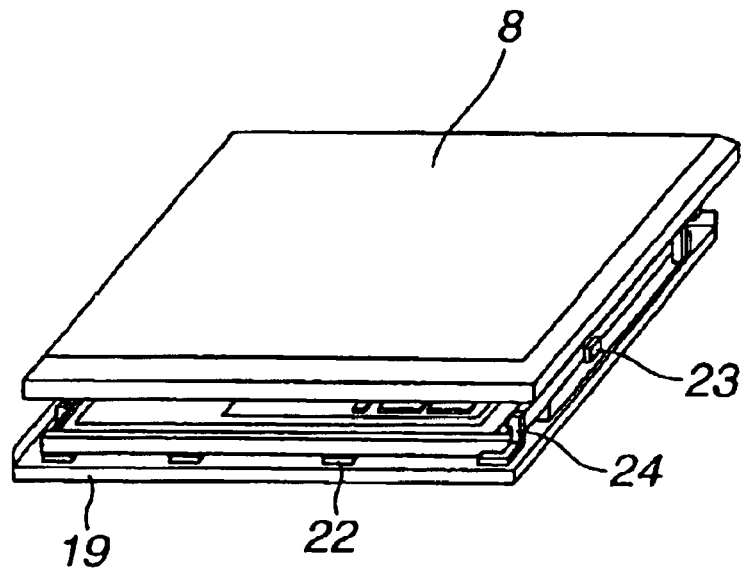
Figure 19:
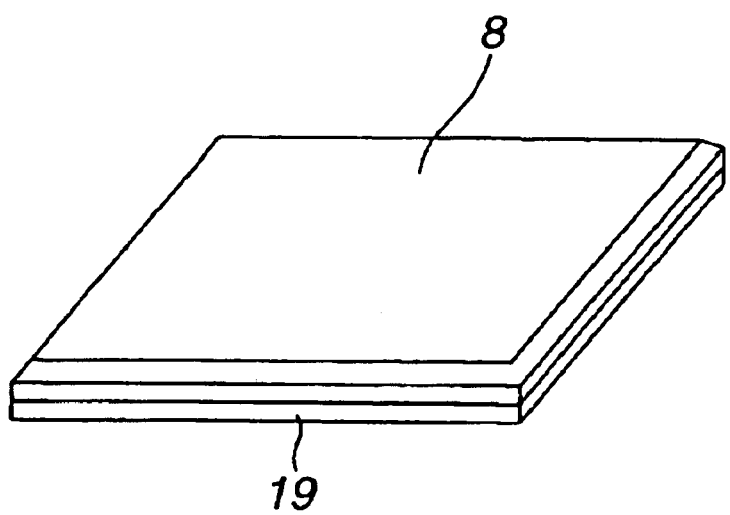

Subsequently, as shown in FIGS. 18 and 19, the housing rear 8 covers the housing front 19. As mentioned before, pressing the housing rear 8 into coupling engagement with the housing front 19 loads the LCP vertical retainer ribs 24 through engagement between the inclined inboard brace wall 27a and the pressure acting site 24a. This inclines the LCP vertical retainer ribs 24 inwardly toward the light conductive plate 9, causing the hooks 24b to move for insertion into the hook holders 27b and into firm engagement with the rear surface of the light conductive plate 9. At peripheral portions, the housing front and rear 19 and 8 are formed with coupling portions 26a and 26b, respectively. Engaging the coupling portion 26a and 26b with each other completes coupling between the housing front and rear 19 and 8.

Figure 20A:
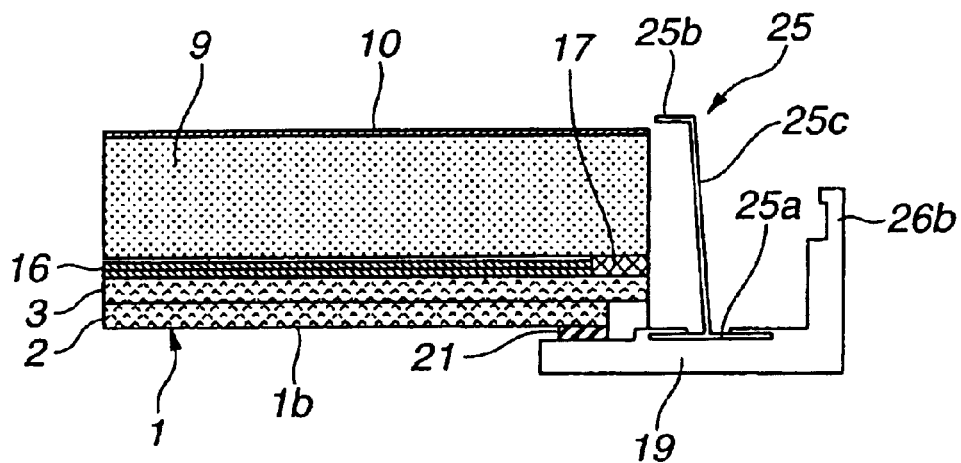
FIG. 20(a) is a similar view to FIG. 7 showing another embodiment.
Figure 20B:
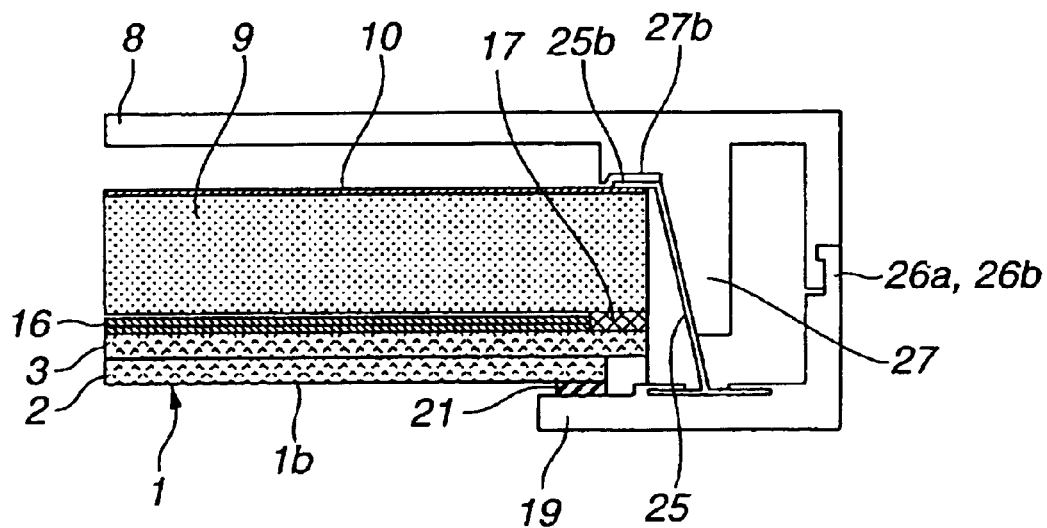
FIG. 20(b) is a section similar to FIG. 20(a) but in loaded state when the housing front and rear are coupled to each other.

With reference to FIGS. 20(a) and 20(b), another exemplary embodiment of the present invention is described. This embodiment is substantially the same as the first-mentioned embodiment except the provision of an LCP vertical retainer 25 formed from a strip of springy metal. At a base 25a, the LCP vertical retainer 25 of springy metal is fixed to a housing front 19. The LCP vertical retainer 25 includes, in addition to the base 25a, a hook 25b and a support portion 25c interconnecting the hook 25b and base 25a. The base 25a is flat and fixed to the housing front 19 by insertion into a receiver, with which the housing front 19 is formed. The support portion 25c is inclined to form an angle ranging from 60 degrees to 90 degrees with the rear surface of the housing front 19.

FIG. 20(b) shows engaged state between the LCP retainer 25 and the associated brace 27. As it is loaded by the brace 27, the support portion 25c is further inclined to bring the hook 25b into firm engagement with the rear surface of a reflector sheet 10 on a light conductive plate 9 in the same manner as the first-mentioned embodiment.

Figure 21A:
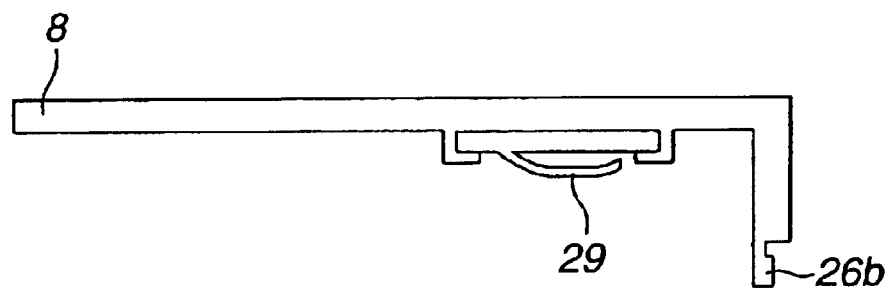
FIG. 21(a) a sectional view of a portion of a housing rear showing a load applying portion in the form of a damper.
Figure 21B:
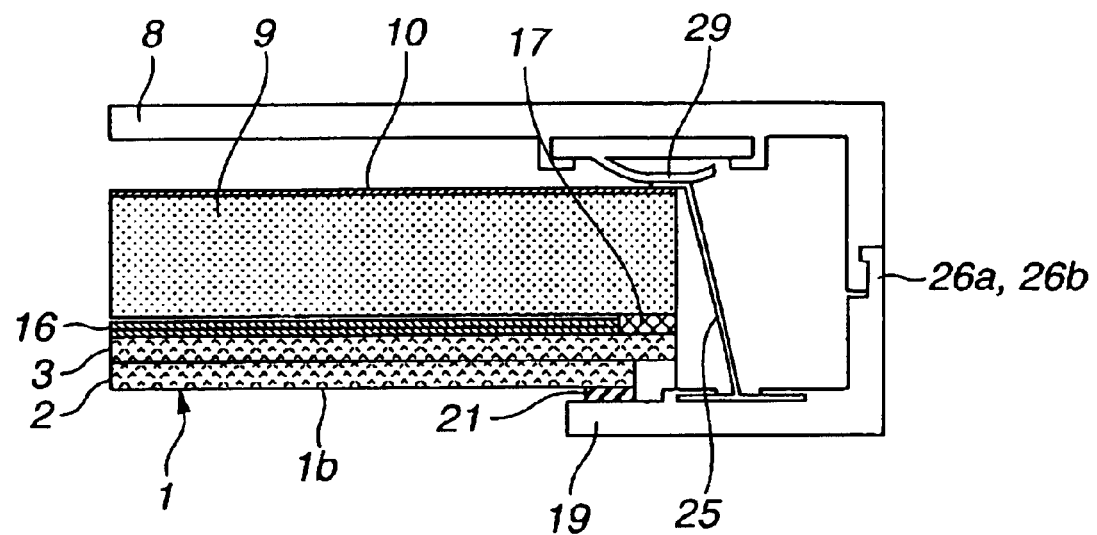
FIG. 21(b) is a section similar to FIG. 7 but in loaded state when the housing front is coupled to the housing rear shown in FIG. 21(a).

With reference to FIGS. 21(a) and 21(b), another embodiment is described. This embodiment is substantially the same as the embodiment shown in FIGS. 20(a) and 20(b) expect the provision of a damper 29 on a housing rear 8 in the place of the brace 27. The damper 29 is formed from a strip of springy metal and arranged to contact with a LCP vertical retainer 25. In the state shown in FIG. 21(b), the damper 29 is compressed to load the LCP vertical retainer 25. Under this loaded condition, the LCP vertical retainer 25 is inclined to bring its hook into firm engagement with the rear surface of a reflector sheet 10 on a light conductive plate 9.

Figure 22A:
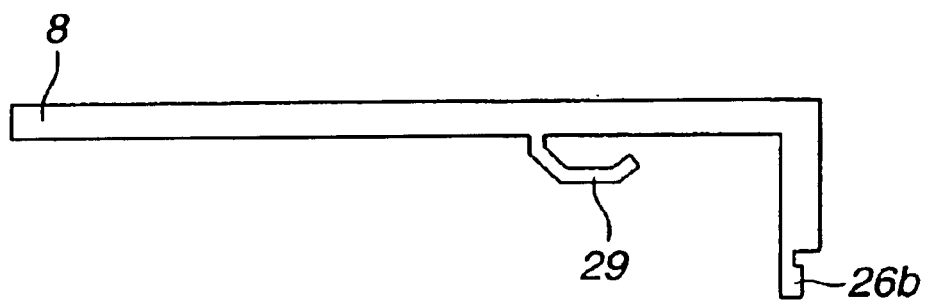
FIG. 22(a) a sectional view of a portion of a housing rear showing a load applying portion in the form of another damper.
Figure 22B:
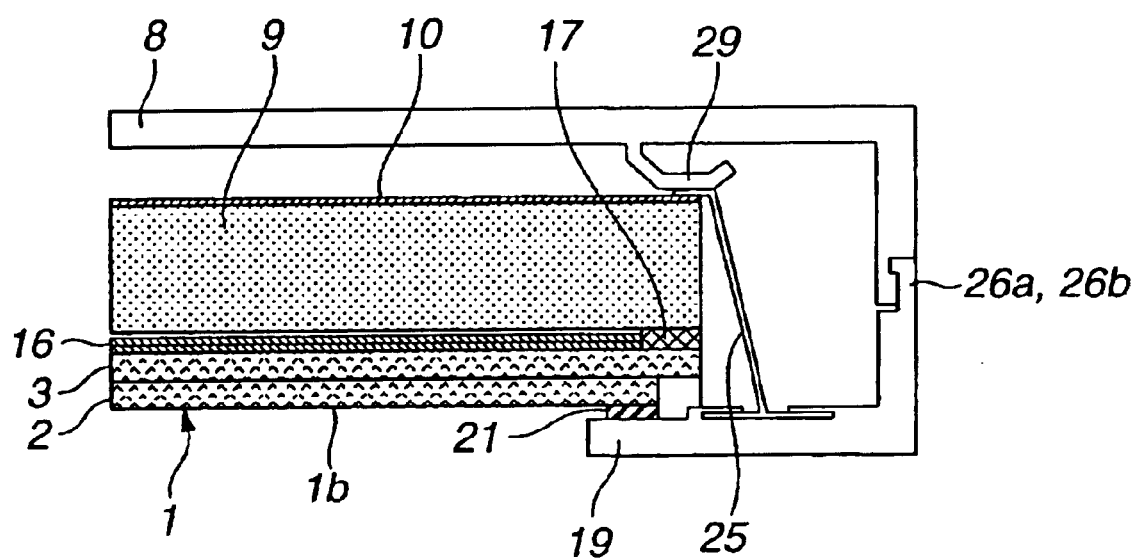
FIG. 22(b) is a section similar to FIG. 7 but in loaded state when the housing front is coupled to the housing rear shown in FIG. 22(a).
Figure 23:
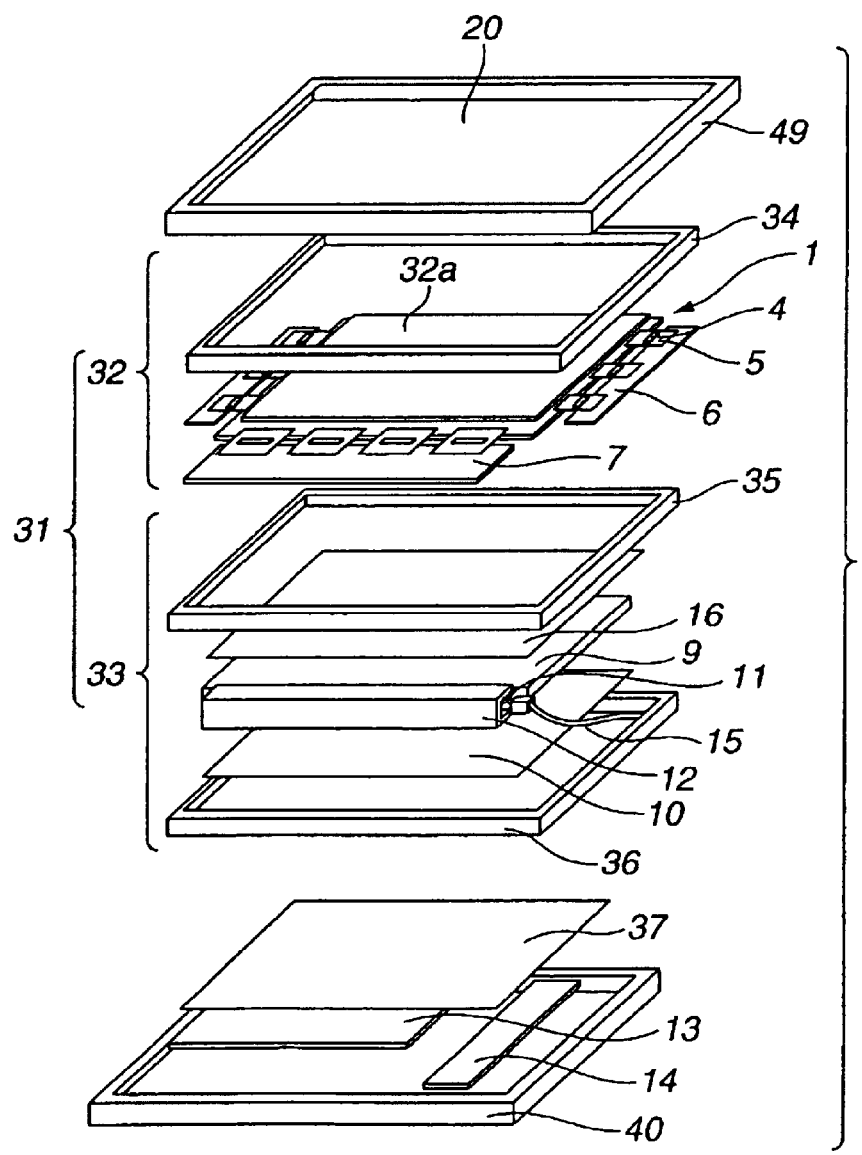
FIG. 23 is an exploded perspective view of a conventional liquid crystal display discussed before.
Figure 24:
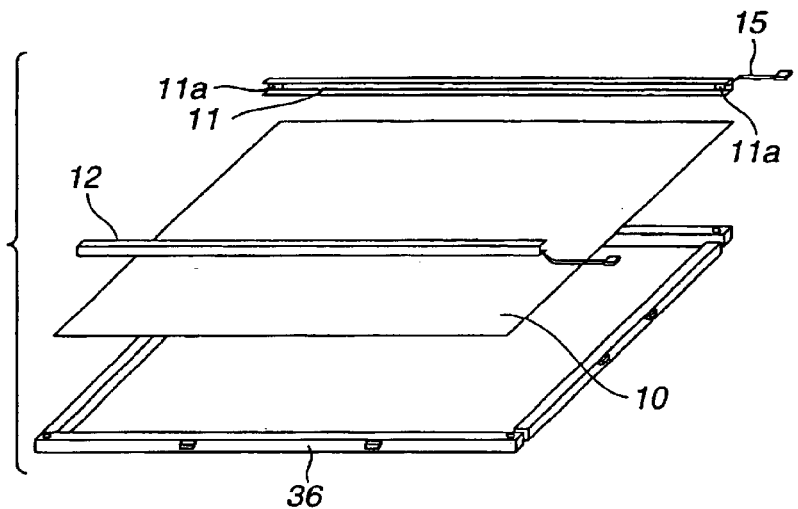
FIG. 24 to 33 are perspective view of fabrication processes of the conventional liquid crystal display.
Figure 25:
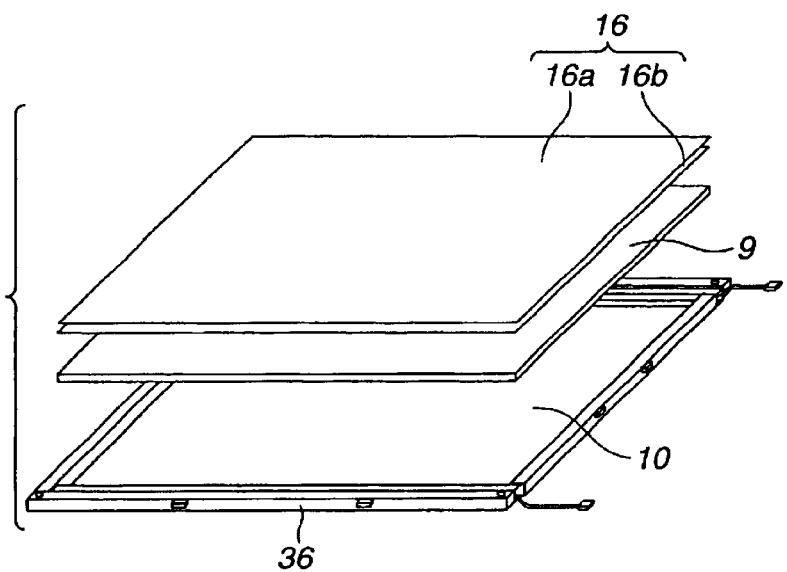
Figure 26:
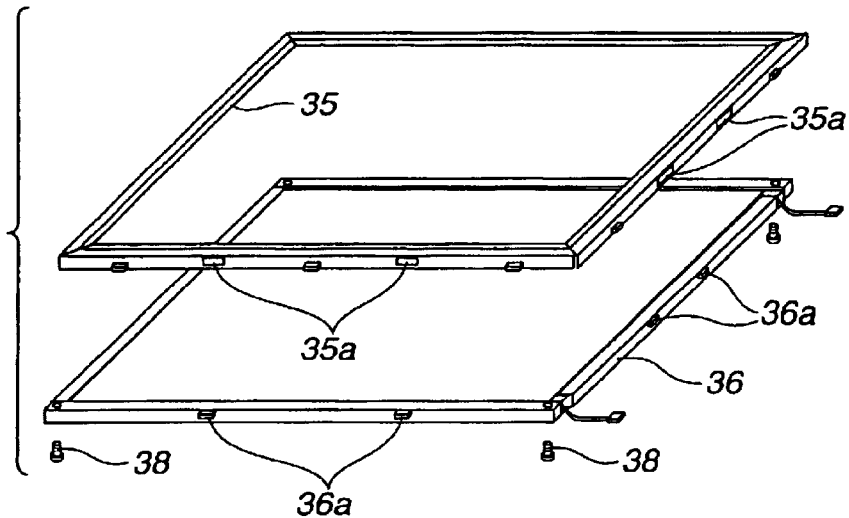
Figure 27:
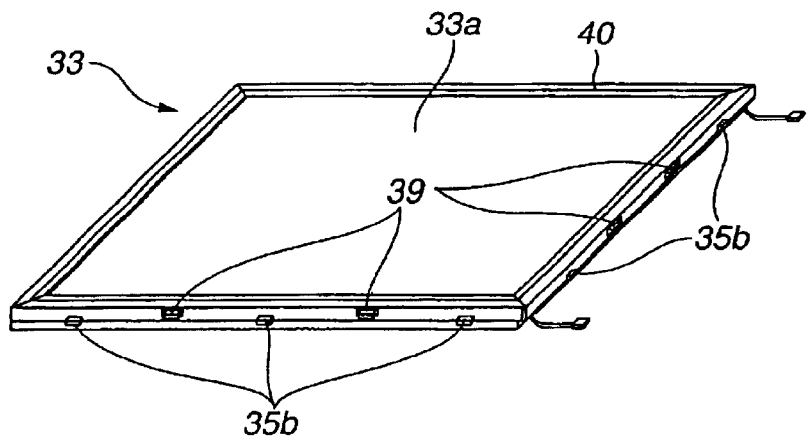
Figure 28:
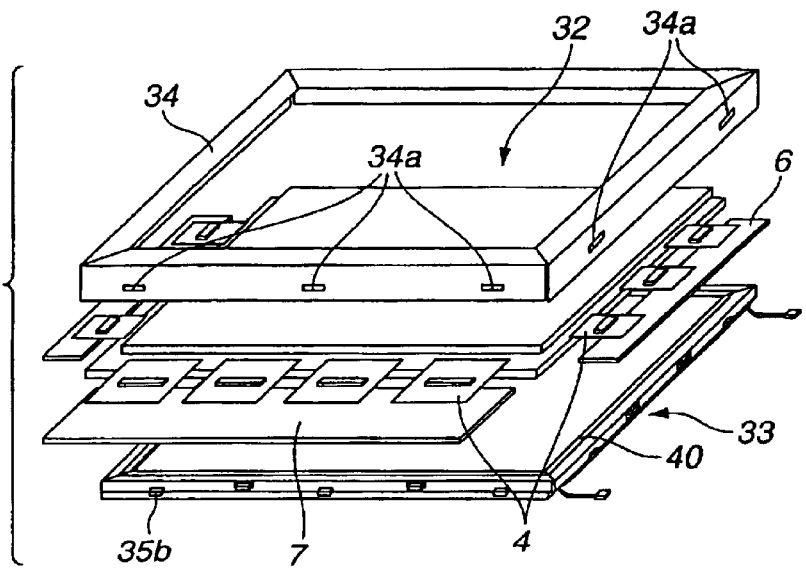
Figure 29:
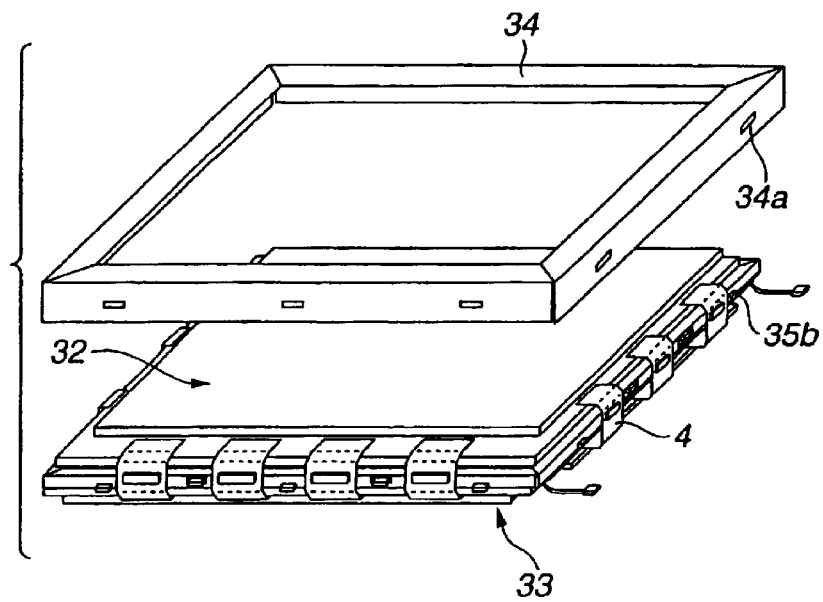
Figure 30:
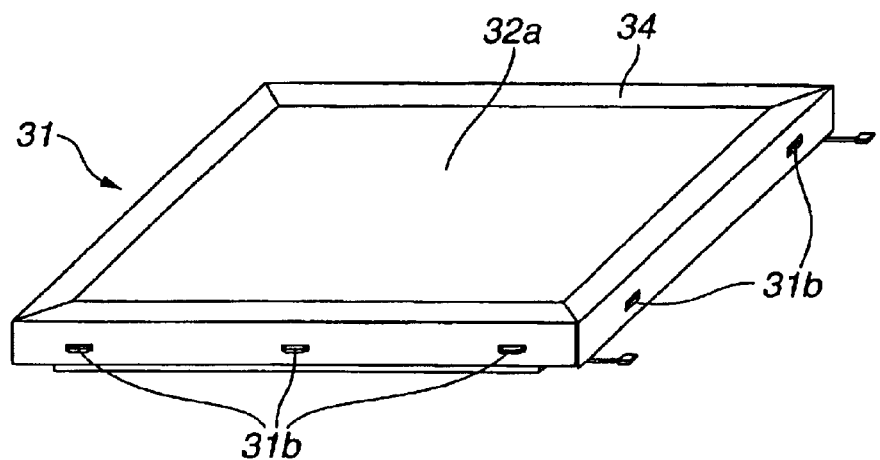
Figure 31:
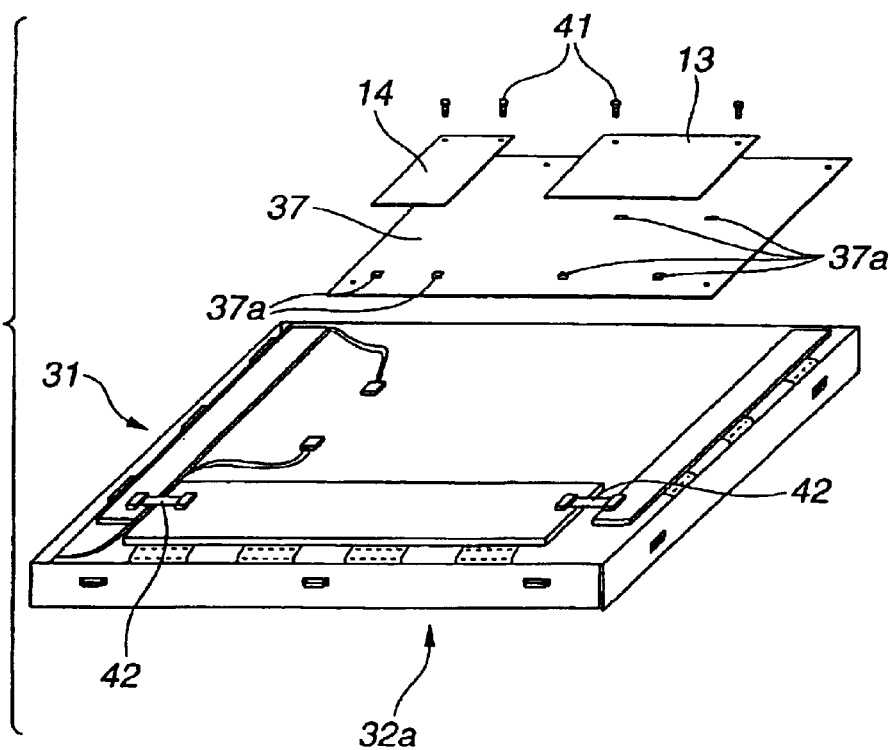
Figure 32:
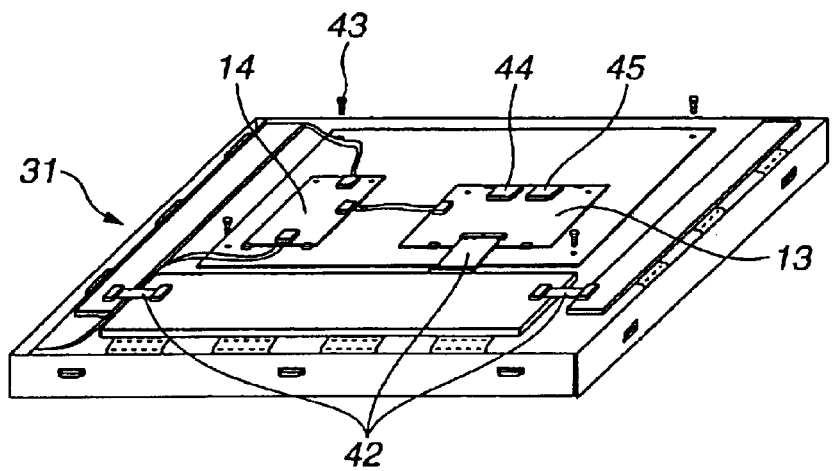
Figure 33:
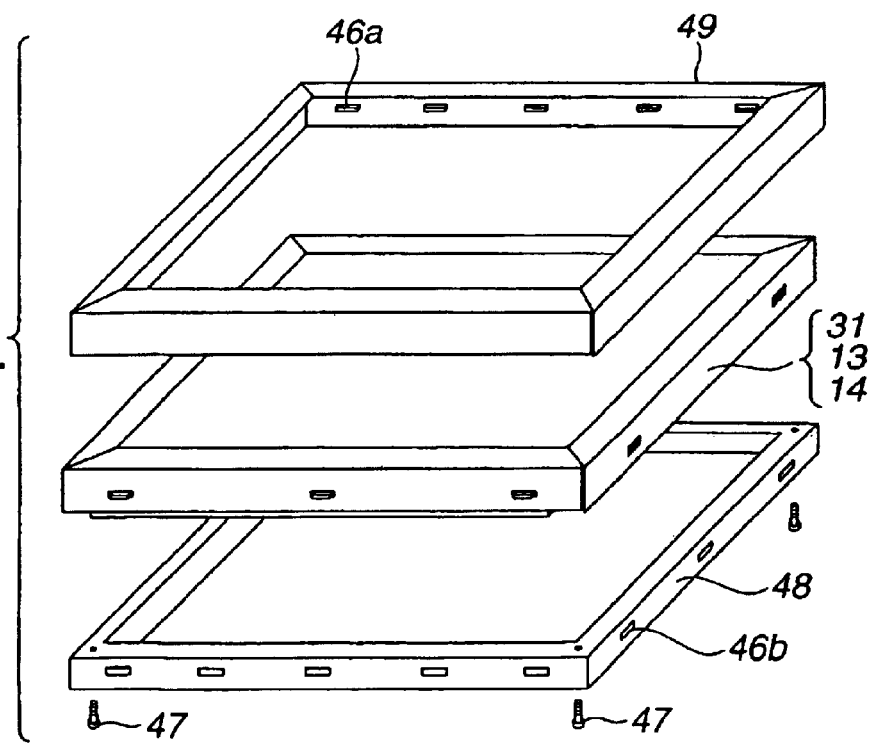

With reference to FIGS. 22(a) and 22(b), another embodiment is described. This embodiment is substantially the same as the embodiment illustrated in FIGS. 21(a) and 21(b) except the design of a damper 29. The damper 29 of this embodiment is formed as an integral part of a housing rear 8.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 2001-368283, filed Dec. 3, 2001, the disclosure of which is hereby incorporated by reference in its entirety.

What is claimed is:

1. A method for fabricating a liquid crystal display (LCD), comprising:

placing a first housing part with a rear surface up, the first housing part being formed with an opening;

placing a liquid crystal display (LCD) panel of a panel unit onto the rear surface with a display surface of the LCD panel down;

placing a light conductive plate onto the LCD panel;

mounting a lamp reflector to the light conductive plate; and coupling a second housing part to the first housing part to retain components including the panel unit, light conductive plate and lamp reflector together, wherein said first housing part includes at least one retainer element, and wherein the second housing part includes at least one load applying element disposed to load the at least one retainer element into engagement with a surface of the components when the second housing part and the first housing part are coupled to each other.

2. The method as claimed in claim 1, wherein the first housing part and the second housing part are coupled with each other by engaging first coupling portions of the first housing part with second coupling portions of the second housing part, and wherein the first coupling portions are located more outboard than the second coupling portions and arranged to cover the second coupling portions.

3. A method for fabricating a liquid crystal display (LCD), comprising:

placing a first housing part with a rear surface up, the first housing part being formed with an opening;

placing a liquid crystal display (LCD) panel of a panel unit onto the rear surface with a display surface of the LCD panel down;

placing a light conductive plate onto the LCD panel;

mounting a lamp reflector to the light conductive plate; and coupling a second housing part to the first housing part to retain components including the panel unit, light conductive plate and lamp reflector together, wherein the first housing part has a horizontal retainer arranged to retain at least one of the components at a desired position within a hypothetical horizontal plane parallel to the display surface of the LCD panel, and a vertical retainer arranged to retain the components together; and wherein the second housing part has a load applying portion arranged to load the vertical retainer into firm engagement with the adjacent one of the components when the second housing part and the first housing part are coupled to each other.

4. The method as claimed in claim 3, wherein the horizontal retainer includes a plurality of protrusions arranged for abutting engagement with at least one of the LCD panel, light conductive plate, and lamp reflector; and wherein the horizontal retainer retains the LCD panel and the light conductive plate separately.

5. A method for fabricating a liquid crystal display (LCD), comprising:

placing a first housing part with a rear surface up, the first housing part being formed with an opening;

placing a liquid crystal display (LCD) panel of a panel unit onto the rear surface with a display surface of the LCD panel down;

placing a light conductive plate onto the LCD panel;

mounting a lamp reflector to the light conductive plate;

coupling a second housing part to the first housing part to retain components including the panel unit, light conductive plate and lamp reflector together, wherein said first housing part includes a vertical retainer, and wherein the vertical retainer has a pressure acting site and a hook at a head end thereof, and the second housing part includes a hook holder; wherein, when the vertical retainer is unloaded, the hook is positioned outboard away from the components; and wherein, when the vertical retainer is loaded by a load applying portion at the pressure acting site, the hook comes into firm engagement with a surface of the components.

6. The method as claimed in claim 5, wherein the load applying portion and the pressure acting site engage with each other to form an interface when the first housing part and the second housing part are coupled to each other; and wherein the interface is inclined.

7. A method for fabricating a liquid crystal display (LCD), comprising:

placing a first housing part with a rear surface up, the first housing part being formed with an opening;

placing a liquid crystal display (LCD) panel of a panel unit onto the rear surface with a display surface of the LCD panel down;

placing a light conductive plate onto the LCD panel;

mounting a lamp reflector to the light conductive plate; and coupling a second housing part to the first housing part to retain components including the panel unit, light conductive plate and lamp reflector together, wherein the panel unit includes flexible substrates interconnecting the LCD panel and a signal processing substrate, wherein, after placing the light conductive plate, the flexible substrates are bent to place the signal processing substrate onto a rear surface of the light conductive plate.

\* \* \* \* \*